March 1, 1960 A. V. BURCH 2,926,819
TILT PLATE PLANTER AND METHOD OF PLANTING
Filed Feb. 26, 1957 6 Sheets-Sheet 1

INVENTOR.
ALVAN V. BURCH
BY Toulmin & Toulmin
ATTORNEYS

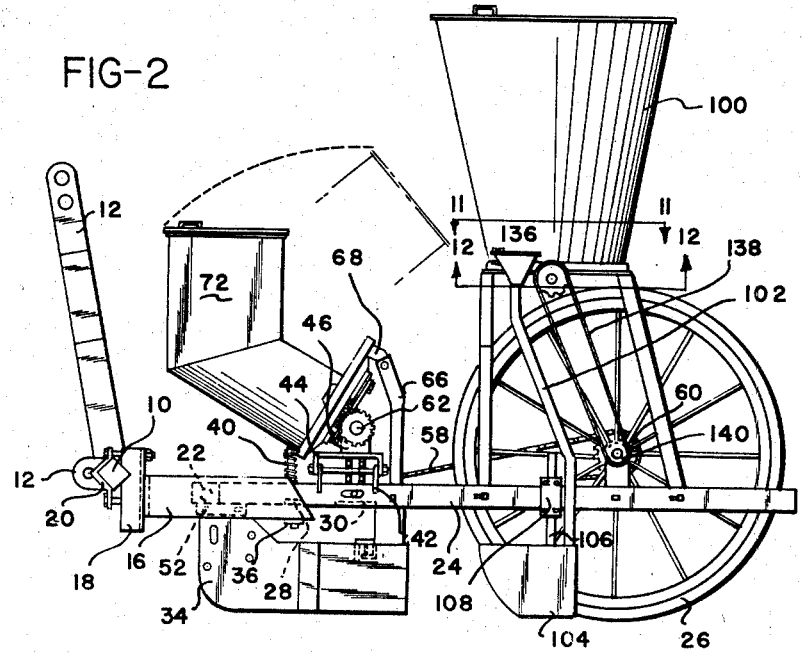
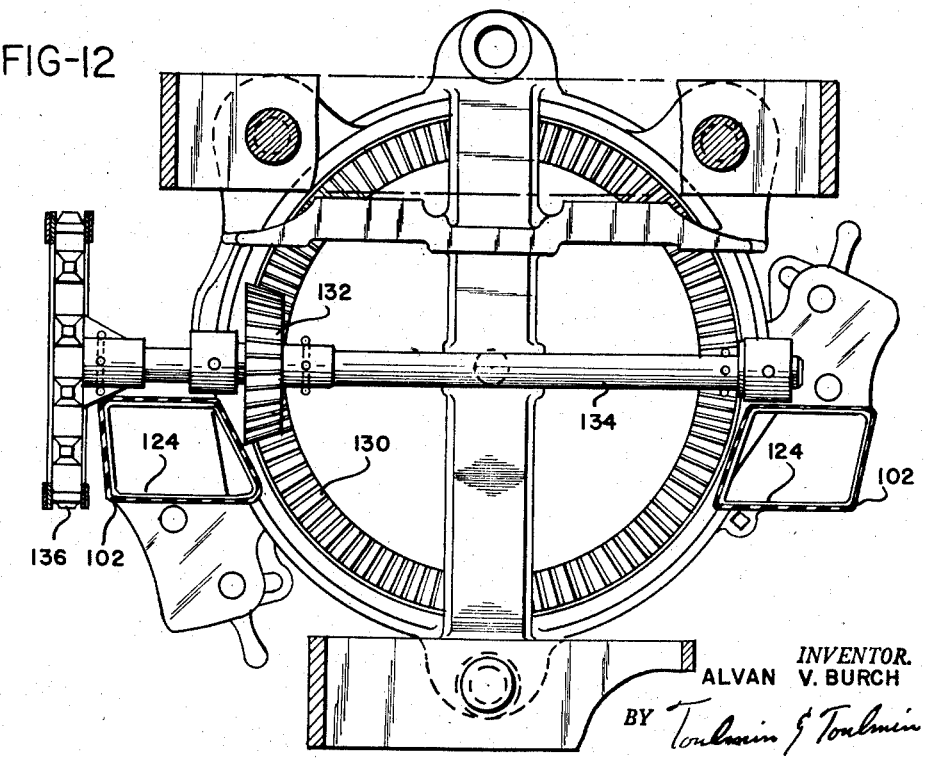

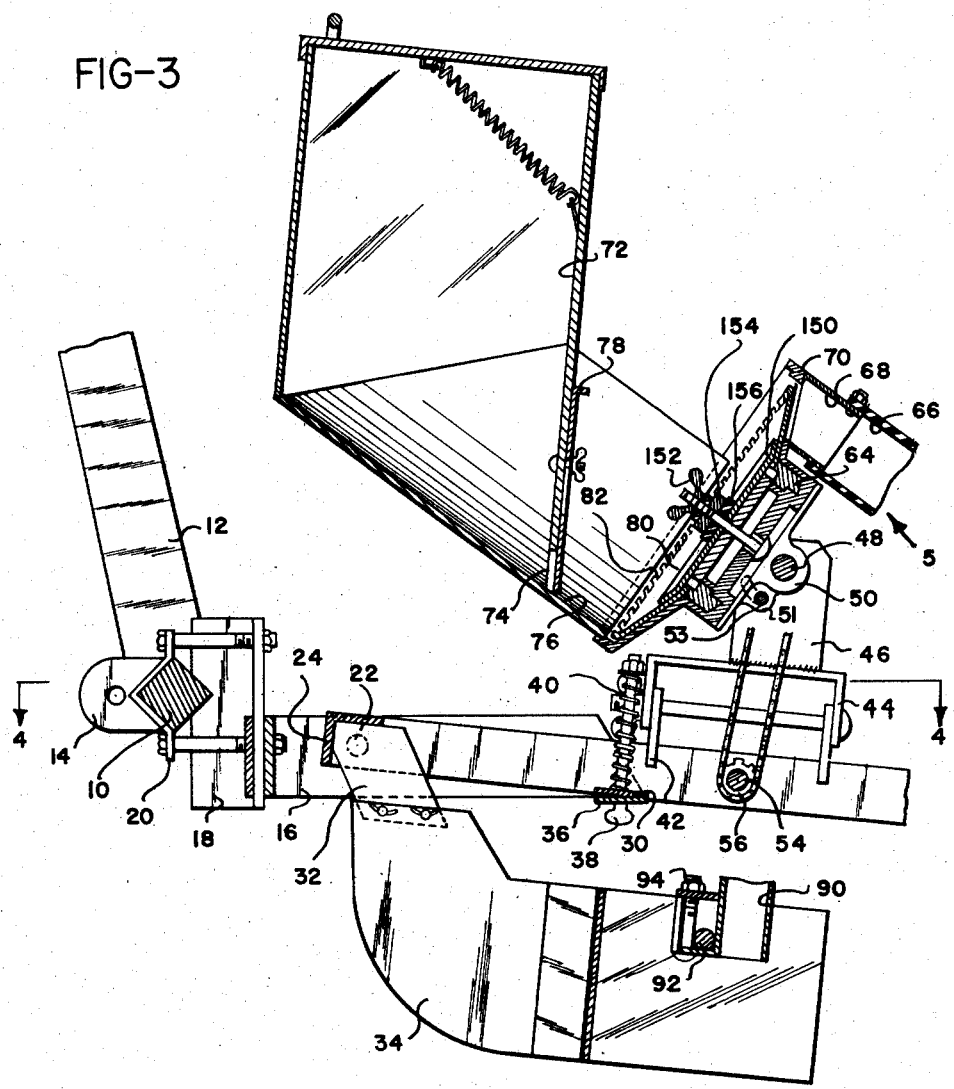

March 1, 1960 A. V. BURCH 2,926,819
TILT PLATE PLANTER AND METHOD OF PLANTING
Filed Feb. 26, 1957 6 Sheets-Sheet 4

INVENTOR.
ALVAN V. BURCH
BY Toulmin & Toulmin
ATTORNEYS

INVENTOR.
ALVAN V. BURCH
ATTORNEYS

March 1, 1960     A. V. BURCH     2,926,819
TILT PLATE PLANTER AND METHOD OF PLANTING
Filed Feb. 26, 1957     6 Sheets-Sheet 6
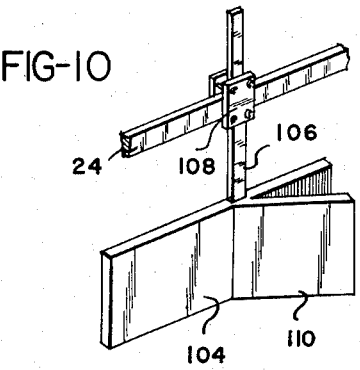
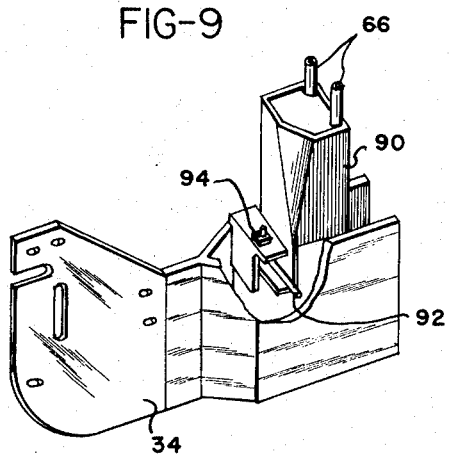
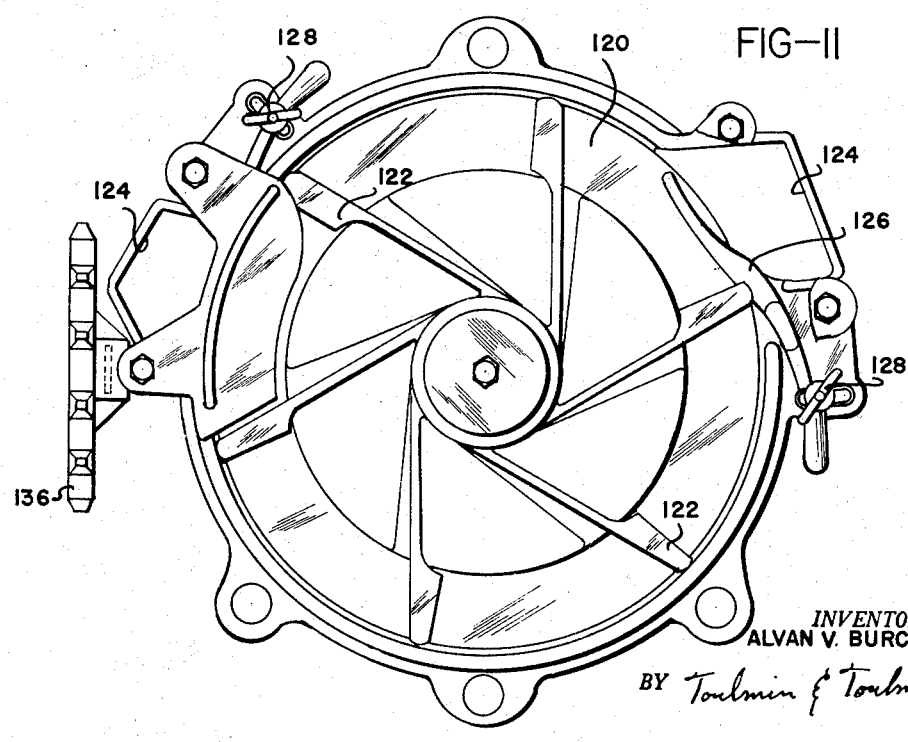
INVENTOR.
ALVAN V. BURCH
BY Toulmin & Toulmin
ATTORNEYS

United States Patent Office 2,926,819
Patented Mar. 1, 1960

2,926,819

TILT PLATE PLANTER AND METHOD OF PLANTING

Alvan V. Burch, Evansville, Ind., assignor to Burch Plow Works, Inc., Evansville, Ind., a corporation of Indiana Application February 26, 1957, Serial No. 642,443

5 Claims. (Cl. 222—142)

This invention relates to planters for planting crops such as corn and the like having seeds of substantial size. More particularly, this invention relates to a planting device of the nature referred to and to a method of operation thereof, and to an improved method of planting, including a novel arrangement and method of applying fertilizer.

Planters of the general nature with which this invention is concerned, and particularly planters generally referred to as corn planters, generally have vertical hoppers with a rotating seed plate in the bottom thereof which carries the seeds to be dispensed individually or in some predetermined multiple thereof to a feed chute through which they drop into a furrow.

This conventional type of corn planter, while widely used, however, has a number of disadvantages, and particularly in connection with the feeding of the seed. This comes about because the planter is rotating under a stack of seeds and the pockets provided at the periphery of the planter may tend to carry too many seeds to the feed chute. To prevent the extra seeds from dropping there is usually provided a stripper arrangement ahead of the feed chute which is supposed to prevent the extra seeds from being carried on around with the planter. Such stripper arrangements are unreliable and crack a great many of the seeds and it tends even to prevent any seed delivery at all. Also, with a conventional seeder of the nature referred to with a horizontal seed plate, the seed must be carefully graded as to size and shape of the individual seeds so that they can be handled properly by the particular seed planter with which they are to be dispensed.

Having the foregoing in mind, the present invention has a particularly object the provision of an improved arrangement for dispensing seeds from a seed hopper in a planter so that the drawbacks referred to above are eliminated.

Another object of this invention is the provision of a seed feeding arrangement for a corn planter or the like in which no stripper arrangement is necessary to prevent overfeeding of the seeds.

Another particular object of this invention is the provision of a corn planter or the like in which the seed can be placed in the hopper in an ungraded condition and still be properly dispensed.

In connection with a great many seeding or planting operations fertilizer is supplied simultaneously with the dropping of the seeds. Usually the fertilizer is applied after the seeds are dropped and usually at a higher level in the ground than the seeds whereby there is no direct contact between the seeds and the fertilizer. However, and particularly with corn, even where the fertilizer is supplied separately from the seeds by either being at a higher or lower level, there is a tendency for the central supporting tap-roots of corn to remain under developed whereby the crop is less firmly anchored in the ground than would otherwise be the case. With this in mind the present invention also proposes an improved method of planting, particularly corn and like crops, wherein the fertilizer is so applied to eliminate the possibility of direct contact between the seed and the fertilizer thus permitting a more complete root development than would otherwise be possible and thus effecting firmer anchoring of the crop in the ground. Such crops are also more resistant to arid conditions since the root system is more extensive.

These and other objects will become apparent upon reference to the following specification taken in connection with the accompanying drawings, wherein:

Figure 2 is a side view of the planter of Figure 1;

Figure 3 is a vertical sectional view through one of the seed hoppers of the present invention and is indicated by line 3—3 on Figure 1;

Figure 9 is a perspective view showing the furrow opener and the chute thereon through which the seeds drop into the furrow;

Figure 10 is a perspective view showing the manner in which the shoe into which the fertilizer is dropped is arranged for adjustable connection with the planter frame;

Figure 11 is a sectional view indicated by line 11—11 on Figure 2 showing the arrangement of the feed plate in the fertilizer distributor hopper;

Figure 12 is a sectional view indicated by line 12—12 on Figure 2 looking up at the bottom of the fertilizer hopper.

Figure 1:
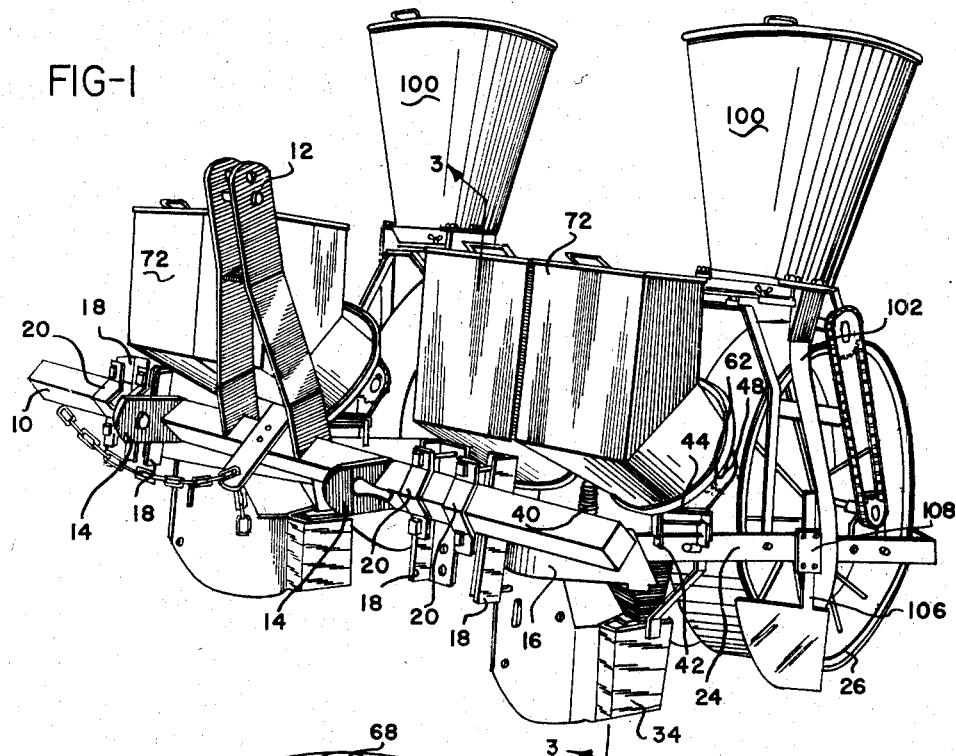
Figure 1 is a perspective view of a planter constructed according to my invention.
Figure 5:
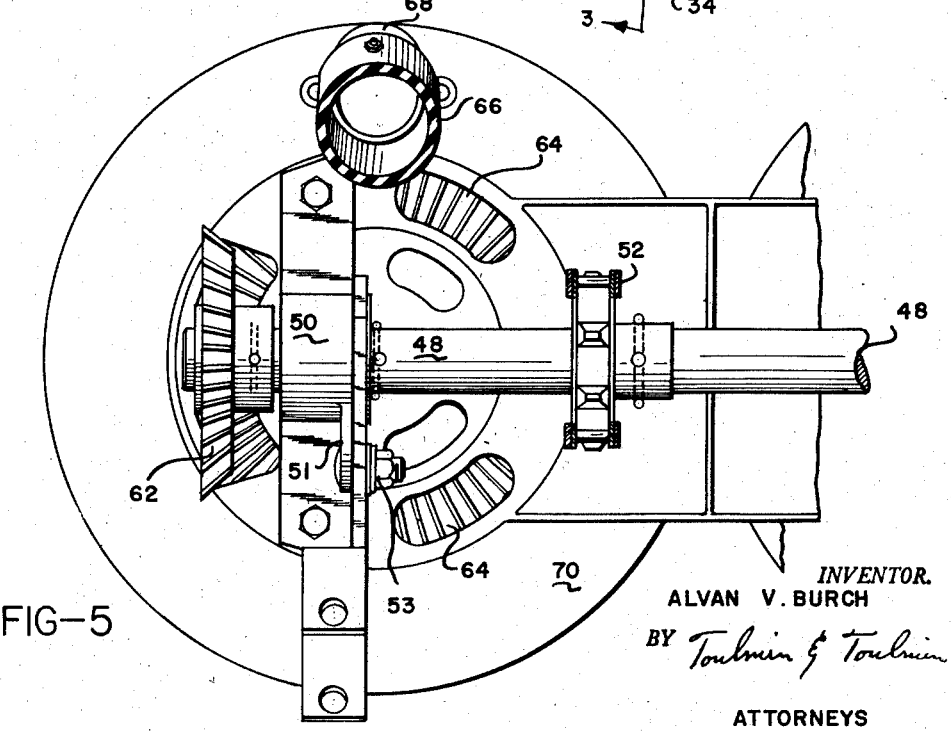
Figure 5 is a view looking up at the bottom of one of the seed hoppers of this invention as indicated by the arrow 5 in Figure 3.
Figure 6:
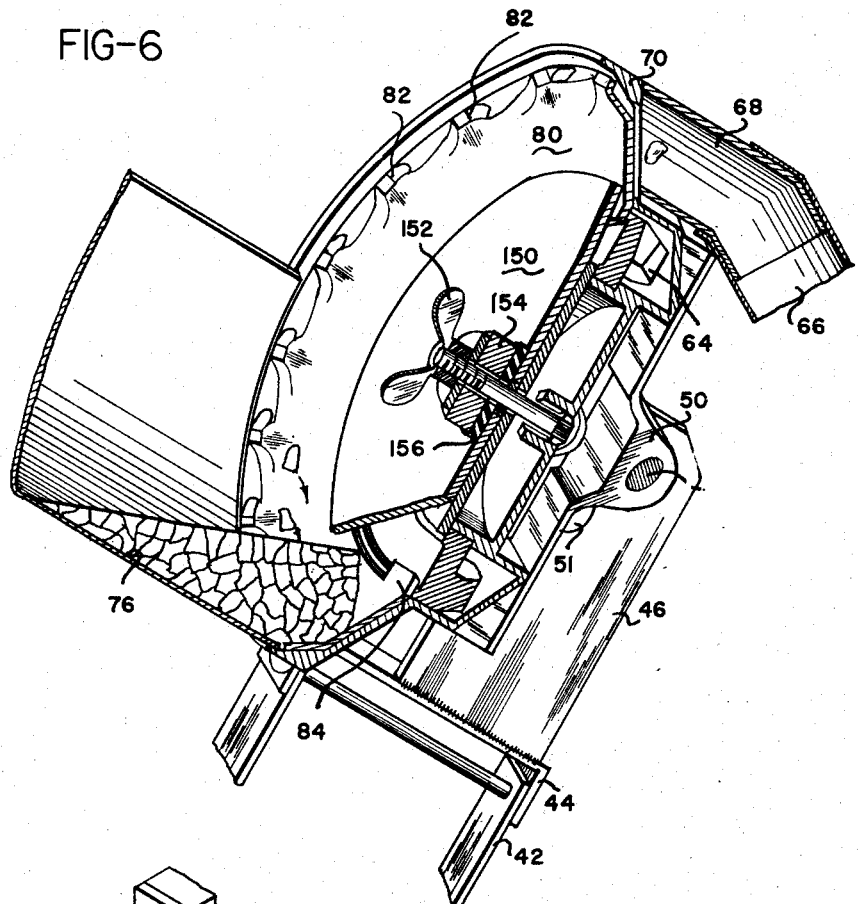
Figure 6 is a perspective view illustrating the support of the tilted rotary seed plate of the present invention and the operation thereof.
Figure 13:
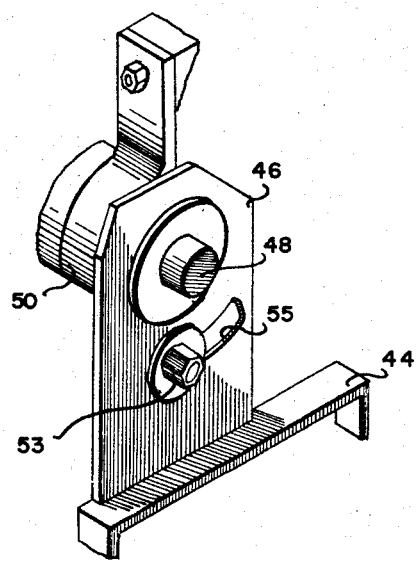
Figure 13 is a perspective view showing the clamp for clamping the tiltable seed hoppers in their several positions.

Referring to the drawings somewhat more in detail, the planter arrangement comprises a transversely extending tool bar 10 having the upstanding members 12 and the horizontal ears 14 making up the elements of a tripod hitch of a known type. This enables the planter to be drawn over the ground while maintaining it at a uniform height and also permits carrying of the planter by raising the bar 10 with the hitch mechanism.

The planter illustrated in the drawings is of the two-row type, but it will be understood that a single-row planter could be constructed according to this invention and that four or more rows could be planted at one time by connecting the individual units together in multiple. Each individual unit, i.e., each single row planting mechanism consists of a U-shaped frame 16 having connected to the front thereof the vertically extending angle members 18 notched for engaging one corner of the bar 10. Angular clips 20 engage the front face of bar 10 and are bolted to angles 18 so that the U-shaped frame of each unit is fixedly connected to the bar 10.

Pivotally mounted within the U-shaped frame 10 as by the pivot bolts 22 is the main frame of the planter consisting of the side rails 24 extending rearwardly on opposite sides of the covering wheel 26.

The main planter frame has toward the front end transverse connecting bars 28 and 30. With the bar 28 being located at the extreme forward end and including a vertical bracket 32 fixed thereto and which is connected with the upper end of the winged sword or furrow opener 34 which has a diverging rear end into which the seed being planted is dropped.

The transverse bar 30 of the main planter frame is disposed immediately above a transverse bar 36 secured to the bottom of the U-shaped frame 16 and the bars 30 and 36 are availed of for receiving a bolt 38 that is surrounded by a compression spring 40 that bears between the upper end of the bolt and bar 30. The compression spring is thus operable continuously to urge the main frame of the planter downwardly against the ground.

The seed dispensing portion of the planter according to the present invention is mounted on top of the main planter frame over the rear end of the sword or furrow opener. This is accomplished by providing the frame with the upstanding clips 42 that are received between the downwardly extending legs of the frame members 44 at the sides of the seeding unit frame. Upstanding from frame members 44 are plates 46 and extending transversely through the upper end thereof is a shaft 48.

The seeder unit, comprising two hoppers and seed plates and a double base frame, has attached thereto the bearing 50 through which shaft 48 extends. The unit is tiltable about the said shaft so that the seed plates therein can operate at different angles when so desired. The bearings 50, or at least one thereof, has a lug portion 51 through which a bolt 53 passes to adjustably clamp the bearing to the adjacent plate 46 which has a slot 55 receiving the bolt.

The shaft 48 carries a sprocket 52 over which a chain passes and this chain passes over sprocket 54 on a shaft 56 extending transversely of the main frame of the planter. This shaft has a sprocket on its one end over which a chain 58 passes and this chain in turn engages a sprocket 60 carried on the shaft of the covering wheel 26. The covering wheel bears on the ground and is rotated thereby and thus drives the planter mechanism.

The shaft 48 previously referred to has a beveled gear 62 beneath each rotary seed plate and each gear 62 engages a gear 64 located within the seeding unit and to which is detachably connected the rotary seed plate that feeds the seed to be planted. The seed that is discharged by each plate falls through a tube 66 into the sword or furrow opener associated with the pertaining unit. Each tube 66 is attached at its upper end to a discharge spout 68 located at the top of the frame 70 of the seeding unit and within which frame the aforementioned gear 64 is rotatable.

As will be seen in Figure 3, each gear 64 and its pertaining frame 70 is connected with a hopper that consists of a main chamber 72 that communicates via opening 74 with a lower portion comprising a small open chute like chamber 76 that is closed at its lower end by frame 70 and the rotating seed plate. A vertically adjusted gate 78 determines the amount of seed that will stand in the bottom of chamber portion 76 and through which the peripheral portion of the seed plate runs as the planter operates.

As will be seen in Figures 3 and 6 through 8, each of the seed plates, indicated by reference numeral 80, is in the form of a ring having a plurality of peripheral pockets 82 and four spaced inwardly extending drive fingers 84. In operation, the rings or seed plates 80 rotate in the direction of arrows 86 and in so rotating pick up seeds from the pertaining one of chambers 76 and carry them upwardly in the pockets 82.

When the seeds in the pockets reach the uppermost point in their travel they drop from the pockets into the discharge spout 68 and fall therethrough into tube 66 and thence down into the furrow opener 34. According to the present invention, the pockets 82 are of such a size as to receive a predetermined number of seeds, for example, a single grain of corn, and any amount in the pockets beyond this will drop out of the pockets by gravity thus leaving only the proper number of seeds to be dropped through the seed tube. This arrangement makes it possible to eliminate all strippers and the like that are ordinarily used to prevent over-feeding of the seeds and this, of course, simplifies the construction and also prevent cracking and breaking of the seeds or jamming of the seed feeding devices.

The angle of the tilt of the feeding unit can be adjusted as is indicated in Figure 2, and this will vary the operating characteristics of the unit in order to accommodate different sizes and shapes and types of seed.

Figure 7:
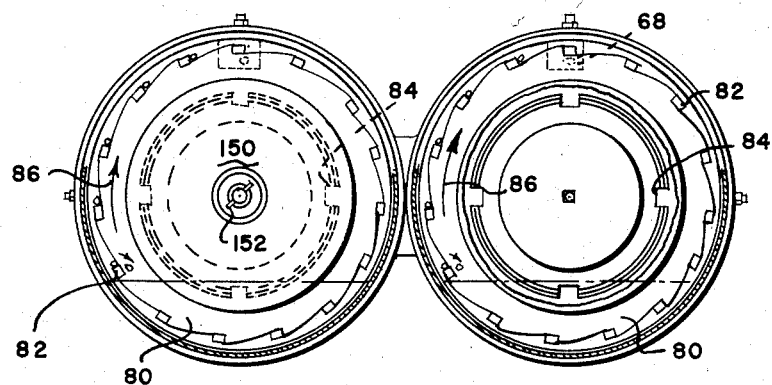
Figure 7 is a view looking in at a pair of the seed plates in a planter according to this invention with the plates arranged to drop seeds simultaneously.
Figure 8:
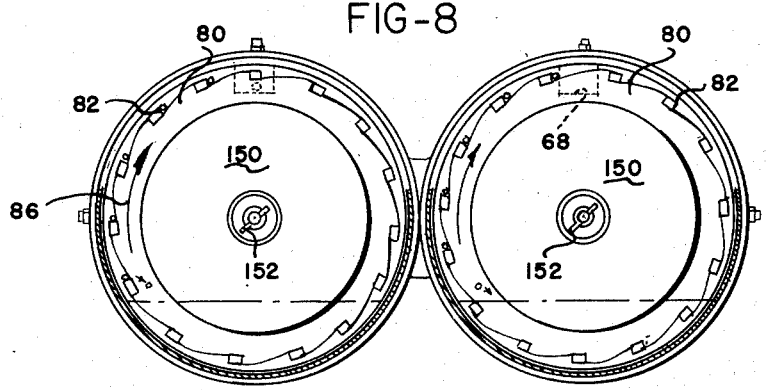
Figure 8 is a view similar to Figure 7 but showing the plates adjusted so as to drop seeds alternately.
Figure 4:
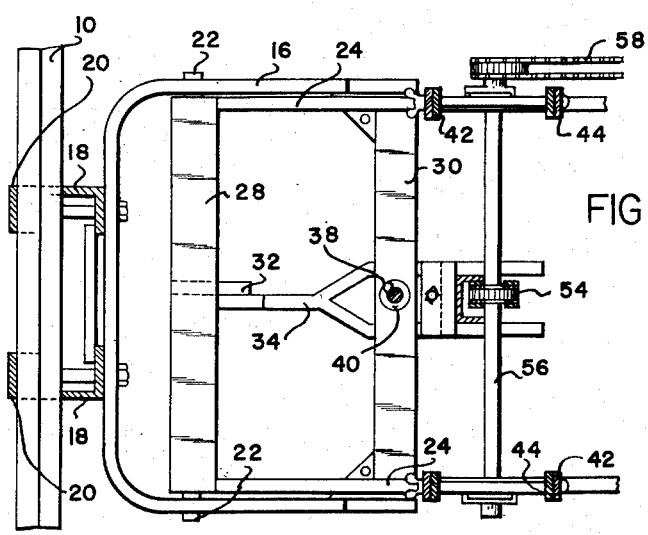
Figure 4 is a plan sectional view of the yoke that connects the planter frame with the tool bar and is indicated by line 4—4 on Figure 3.

A feature of the present invention is illustrated in Figures 7 and 8 wherein the seed plates of Figure 7 are arranged so that the pockets 82 of the two plates occupy identical angular positions thereby providing for simultaneous dropping of seeds from the plates into the discharge spouts. The plates are so arranged, however, that rotation of one through an angle of 180 degrees will bring the pockets out of register so that the two adjacent seed plates of each individual unit will drop their seeds alternately, thus obtaining a more uniform distribution of seeds along the crop row.

The two tubes 66 of the two feeding devices which are arranged side-by-side in each unit lead, of course, in one and the same sword or furrow opener. This is illustrated in perspective in Figure 9 wherein the tubes will be seen to enter a sheet metal chute 90 which extends down between the legs of the bifurcated rear end of the furrow opener to be retained therein by engaging beneath a transversely extending rod 92 and being clamped fixedly in position by the clamp and bolt 94.

The present invention, in addition to the tilted plate seeding device described above, also contemplates the provision of a novel arrangement for supplying fertilizer at the time of planting. This is accomplished by providing a fertilizer hopper 100 pertaining to each planting unit and which fertilizer hopper has a discharge tube 102 on each side thereof extending downwardly and entering the bifurcated rear end of the opener shank 104 that has a vertical support bar 106 extending upwardly therefrom and through a clamp at 108 that clamps the opener to the side of the main planter frame.

As will be seen in Figure 10 the opener 104 comprises one straight side and a portion 110 extending at an angle thereto. The purpose of this arrangement is to permit the opener to be mounted on either side of the wheel 26, and when mounted on one side it will tend to throw dirt away from the wheel, and when mounted on the other side it will tend to throw dirt into the wheel thereby obtaining a more pronounced hilling effect. The clamps 108 are movable longitudinally of the frame so that the opener 104 can be positioned beside the wheel 26 or in advance thereof, and may even extend over the path of wheel 26 if desired.

The advantage of the location of the opener 104 to the side of the furrow in which the seeds are dropped is that by applying the fertilizer to the sides of the furrow any possibility of direct contact between the fertilizer and the seed is eliminated and this permits a more complete development of the root structure of the plants.

The fertilizer feeding structure according to the present invention differs from conventional fertilizer dispensing structures in that there are two discharge openings leading from the fertilizer hopper so that fertilizer is delivered to both sides of the row being planted.

A plan view looking down on top of the feed plate in the fertilizer hopper is illustrated in Figure 11. In Figure 11 the feed plate 120 will be seen to consist of a plurality of substantially radial fingers 122 which cause rotary movement of the fertilizer about the bottom of the fertilizer hopper. At the opposite sides of the hopper there are the discharge openings or pockets 124 and adjustably mounted in the discharge openings are regulator arms 126 which are adjustable by means of the wing nut and clamp bolt arrangement 128 whereby to vary the effective opening through which fertilizer is distributed to each pocket thus permitting close regulation of the total amount of fertilizer discharged.

The driving of fertilizer feed plate 120 is accomplished, as will be seen in Figures 11 and 12, by a beveled gear portion 130 formed on the back thereof that meshes with a beveled gear 132 on a shaft 134 journaled in the frame supporting the fertilizer hopper and having sprocket 136 on one end thereof which is connected, as will be seen in Figure 2, by a chain 138 with a sprocket 140. The rotation of the covering wheel 26 is thus effective for driving the fertilizer dispensing unit as well as the seeding unit. As has been explained above, the exact manner in which the fertilizer is supplied to the furrow, i.e., whether it is disposed far to the side or more nearly adjacent the row of seeds is determined by the positioning of shanks 104 which are adjustably carried on the planter frame.

A particular feature of the present invention, centering about the novel tilted seed plate arrangement, resides in the manner in which the seed plate is retained in position. Since the seed plate rotates over the stationary frame in which it is mounted with a small clearance therebetween, it follows that there will be a tendency for small particles of foreign material to get between the seed plate and the frame.

This is the cause of considerable trouble in ordinary edge drop seeders where the seed plate rotates in a horizontal plane. According to the present invention, substantially all of the difficulties in connection with such foreign material is eliminated by retaining the seed plate in position by a retaining disk 150 that is held down in place by a wing nut 152 and collar 154 beneath which there is a resilient washer 156. The resilient washer permits yielding of the disk 150 so that foreign material which might get beneath seed plate 156 does not jam the mechanism but will merely cause a slight tilting of the seed plate and disk, and will probably roll out from beneath the seed plate in a fraction of a revolution thereof.

It will be evident that the structure described above is a simple basic combination of a planter unit and a fertilizer distributor. Many modifications can be made within the scope of the present invention while still utilizing the same basic structure. For example, there could be mounted on the bar 10 in front of the planter a disk, referred to as a rolling fin, to prevent side drifting of the unit, or markers could be supplied with the unit if so desired.

There could be provided other ground working implements attached to the front of the planter such as shovels or moldboard plow bottoms, and likewise various other attachments well known in the art could be provided.

The angle members 18 at the forward end of the U-shaped members 16 could be advantageously employed for supporting any of the ground working implements referred to above. Similarly, certain implements such as a shovel unit could be adapted for attachment to the front end of the sword 34 and still others could be attached directly to the bar 10.

A planter of the nature described above can be utilized for planting substantially any crop having seeds that fall between certain size limitations. For example, amongst crops that can be planted by a planter of this nature are soy beans, cotton, popcorn, corn, sorghum, Kaffir corn, sugar beets, and others. For various crops certain planters of different characteristics could be employed. For example, for sugar beets seed plates with as many as 72 pockets could be employed, whereas, for corn and beans, seed plates with as few as 5 or 6 pockets could be employed. Merely by exchanging the seed plate the unit can be adapted for a wide variety of crops. In most cases, the seed plates can be arranged so that the two plates associated with each unit will drop simultaneously or alternately whereby the distribution of the seed within the crop row can be varied.

It will be evident that the variation in the number of pockets or holes in the seed plate will have a substantial effect on the spacing between successive drops. For example, a 24-hole plate could be arranged to make a drop every 4½"; and, a 5-hole plate, by changing the drive ratio of the chain drive could be made to drop only every 42". The actual average distance between drops could be doubled without changing the amount dispensed per acre by setting the planter to drop simultaneously instead of alternately, and the dropping distance could be doubled while the rate of dispensing seed per acre reduced to half by closing off one of the pair of seed hoppers which can be accomplished merely by sliding the gate 78 downwardly to closed position.

The tilt plate planter described above is particularly characterized in being able to handle uneven seed thus making it possible to eliminate expensive highly accurate grading of seed before placing it in the planter hopper. The adjustment of the angle of tilt of the hopper and seed plate assemblies is used to obtain the most accurate drop of seed and to eliminate double crops and multiple drops whereby the assembly can be adjusted to accommodate the particular size and weight in the hopper.

The planter according to the present invention is of relatively simple construction, being no more complex than a conventional edge drop planter, but has the features inherent therein which are referred to above that eliminate the particular problems that are associated with edge drop planters. Thus, an improved control of the planting operation is obtained, thus thereby increasing yield while reducing planting and cultivating expenses. A further feature of the planter of the present invention is that it can be operated at a relatively high speed without skipping and without introducing the problem of seeds being crushed or cracked or hills being stripped as takes place when an edge drop planter is operated beyond a predetermined low speed.

The method of planting disclosed in the present application has merit because it avoids "burning" of the seeds; and, since the fertilizer is remote from the seeds, a more complete development of the root structure of the crop is had than would otherwise be possible. Since the fertilizer is remote from the seeds in the crop row, it is possible to apply a great deal more fertilizer according to the method of the present invention than according to previous methods; and this, of course, leads to increased yields while maintaining the soil in a good balanced condition at all times.

As has been mentioned previously, a particular feature of the present invention resides in the fact that the mechanism will drop irregular sized seeds evenly at speeds up to tractor speeds, and that such operation is substantially impossible to obtain with ordinarily edge-drop planters in connection with which the seed must be carefully graded.

In connection with corn, for example, only two different seed plates are required; one plate for round grains and another plate for flat grains.

A further feature of the present invention resides in the large size of the seed plates. The larger size seed plates employed in the planter of the present invention permits the use of more pockets about the edging thereof, thereby slowing down the rotation of the plate and permitting operation of the planters at tractor speeds without the seed throwing out from the pockets.

Another feature of the planter of the present invention is in the floating arrangement of the plater frame which permits the frame to follow uneven terrain while still maintaining a substantially uniform depth of planting. This is accomplished by pivoting the main planter frame to the supporting yoke at the front, and spring-urging the planter frame downwardly so that the covering wheel is also pressed against the ground, and the planter frame will rise and fall as the covering wheel follows the terrain. This permits differential movement between the tractor and the planter frame whereby the superior results referred to are had.

It will be understood that this invention is susceptible to modification in order to adapt it to different usages and conditions; and, accordingly, it is desired to comprehend such modifications within this invention as may fall within the scope of the appended claims.

I claim:

1. In a planter; a pair of seed hoppers, each said hopper comprising a main chamber and a lower chamber portion extending in a downwardly inclined direction from thereof, an adjustable gate between each main chamber and its pertaining said lower chamber portion for regulating the depth of seed that will be maintained in each said lower chamber portion as supplied thereto from the main chamber, a tilted seed plate having its periphery dipping into each said lower chamber portion, each seed plate being formed with peripheral pockets so that rotation thereof will carry seeds upwardly from the said lower chamber portion, a duplex frame in which the seed plates are rotatably mounted, said frame comprising a drop chute leading therefrom at the upper edge of each seed plate and into which drop chutes the seeds in the pockets drop backwardly from the plates, a transverse shaft beneath said duplex frame, a direct geared drive from said shaft to each said seed plate, means for driving said shaft, and means for tiltably supporting said hoppers, and the duplex frame, and the plates therein on the axis of said shaft, each seed plate being frusto-conical and being resiliently pressed against said frame.

2. In a planter; a pair of hoppers arranged side-by-side, each hopper comprising a main chamber and an arcuate lower chamber portion leading somewhat downwardly inclined from the bottom of the main chamber, a gate between each main chamber and its pertaining lower chamber portion adjustable to regulate the opening therebetween, an upwardly and backwardly inclined frame attached to the ends of said lower chamber portions opposite the said main chambers, a seed plate rotatably mounted in the frame in alignment with each said lower chamber portion so as to have its lower edge dip into the seed therein, a plurality of seed pockets formed about the periphery of each seed plate, each pocket being open front and back whereby excess seeds will drop from the pocket as the seed plates rotate, a drop chute in the upper part of the frame for each seed plate for the seed to drop backwardly from the pockets therein, each seed plate comprising a center drive member, an outer ring part having the seed pockets therein detachably keyed to said drive member, a retaining disc over-lying the inner part only of the said outer ring to retain it in position, and resilient means holding said disc in place whereby said seed plates can tilt upwardly slightly from the frame if foreign matter gets therebeneath.

3. In a planter; a planter frame, and a pair of hoppers in side-by-side relation carried by the frame, each hopper having a main chamber portion and a lower chamber portion at the bottom extending rearwardly and slightly downwardly therefrom and there being a gate between each main chamber portion and its pertaining lower chamber portion, an upwardly and rearwardly extending frame closing the rear ends of said lower chamber portions and attached thereto, seed plates in each chamber portion rotatably mounted against the frame, each seed plate having its lower edge dipping into the seed in the pertaining lower chamber portion and being formed with peripheral pockets so as to pick up seed as the plate rotates, said pockets being adapted to drop off excess seed as the plate rotates, a drop chute leading from the frame at the top of each plate so that the seeds retained in the pockets will drop backwardly therefrom into the chutes, a drive shaft extending transversely beneath the said frame and direct geared driving connections between the said drive shaft and the seed plates, means tiltably supporting the hoppers and frame on the axis of the said shaft, and means for driving said shaft as the planter moves.

4. In a planter, a frame portion adapted for being rigidly fixed to a draft implement, a planter frame having its front end pivotally mounted in said frame portion, spring means acting between said frames to cause the planter frame to be spring urged downwardly so as to bear continuously against the ground being traversed, a seeding unit carried on the planter frame comprising a pair of adjacent hoppers, each hopper comprising a main chamber portion and a rearwardly and downwardly extending lower chamber portion at the bottom, an adjustable gate connecting each main chamber portion with its pertaining lower chamber portion, a duplex frame extending upwardly at the rear ends of the lower chamber portions and connected thereto, a seed plate in each frame rotatably mounted against the frame having its lower edge dipping into the seed in the pertaining lower chamber portion and having peripheral pockets so as to pick up seed as the plates rotate, said pockets being open front and back so that excess seed drops therefrom to the front as the plates rotate, a drop chute leading from the frame at the top of each plate so the seeds retained in the pockets will drop backwardly into the chutes, a drive shaft extending transversely beneath said frame and directly geared to the seed plates, means for driving said drive shaft, and means tiltably supporting the frame, and therewith the hoppers on the axis of the said shaft whereby the angle of inclination of the seed plates can be varied to vary their operating characteristics.

5. In a planter, a frame portion adapted for being fixed rigidly to a draft implement, a planter frame having its forward end pivotally mounted in said frame portion, spring means acting between the frames whereby the planter frame is urged continuously against the ground being traversed, a seeding unit carried on the planter frame comprising a pair of adjacent hoppers, each hopper comprising a main chamber portion and a rearwardly and downwardly extending lower chamber portion at the bottom, an adjustable gate connecting each main chamber portion with its pertaining lower chamber portion, a duplex frame extending upwardly at the rear ends of the lower chamber portions and connected thereto, a seed plate in each frame rotatably mounted against the frame having its lower edge dipping into the seed in the pertaining lower chamber portion and having peripheral pockets so as to pick up seed as the plates rotate, said pockets being open front and back so that excess seed drops therefrom to the front as the plates rotate, a drop chute leading from the frame at the top of each plate so the seeds retained in the pockets will drop backwardly into the chute, a drive shaft extending transversely beneath said frame and directly geared to the seed plates, means for driving said drive shaft, and means tiltably supporting the frame, and therewith the hoppers on the axis of the said shaft whereby the angle of inclination of the seed plates can be varied to vary their operating characteristics, each said plate comprising an outer ring part having the said pockets, and a second part drivingly supporting the ring part and being geared to the drive shaft, and said plates being adjustable relative to each other so that the pockets pertaining thereto register simultaneously with their respective chutes or register alternatively therewith.

References Cited in the file of this patent

UNITED STATES PATENTS 902,516   Wilson _____ Oct. 27, 1908

(Other references on following page)

UNITED STATES PATENTS

| | | |
|---|---|---|
| 908,549 | Cole | Jan. 5, 1909 |
| 971,856 | Lemons | Oct. 4, 1910 |
| 1,457,038 | Lane et al. | May 29, 1923 |
| 1,557,856 | Luebbing | Oct. 20, 1925 |
| 1,613,831 | Huntington | Jan. 11, 1927 |
| 1,756,002 | Nagy | Apr. 22, 1930 |
| 1,895,962 | Bateman et al. | Jan. 31, 1933 |
| 1,908,255 | Kaupke | May 9, 1933 |
| 1,912,248 | Bateman et al. | May 30, 1933 |
| 2,001,003 | Tuft | May 14, 1935 |
| 2,017,759 | Kriegbaum et al. | Oct. 15, 1935 |
| 2,054,552 | Wakeham | Sept. 15, 1936 |
| 2,199,065 | Bell | Apr. 30, 1940 |